United States Patent
Yang et al.

(10) Patent No.: US 9,477,721 B2
(45) Date of Patent: *Oct. 25, 2016

(54) SEARCHING MEDIA PROGRAM DATABASES

(71) Applicant: Hulu, LLC, Santa Monica, CA (US)

(72) Inventors: Ting-hao Yang, Shanghai (CN); Zhibing Wang, Beijing (CN); Yizhe Tang, Beijing (CN); Qian Chang, Beijing (CN)

(73) Assignee: HULU, LLC, Santa Monica, CA (US)

( * ) Notice: Subject to any disclaimer, the term of this patent is extended or adjusted under 35 U.S.C. 154(b) by 187 days.

This patent is subject to a terminal disclaimer.

(21) Appl. No.: 13/747,222

(22) Filed: Jan. 22, 2013

(65) Prior Publication Data

US 2014/0040240 A1 Feb. 6, 2014

Related U.S. Application Data

(63) Continuation of application No. 13/348,405, filed on Jan. 11, 2012, now Pat. No. 8,364,707, which is a continuation of application No. 12/351,578, filed on Jan. 9, 2009, now Pat. No. 8,108,393.

(51) Int. Cl.
*G06F 17/30* (2006.01)

(52) U.S. Cl.
CPC ..... *G06F 17/30554* (2013.01); *G06F 17/3082* (2013.01); *G06F 17/30864* (2013.01); *Y10S 707/913* (2013.01)

(58) Field of Classification Search
CPC .................. G06F 17/3002; G06F 17/30017; G06F 17/30029
See application file for complete search history.

(56) References Cited

U.S. PATENT DOCUMENTS

| | | | |
|---|---|---|---|
| 5,832,494 | A | 11/1998 | Egger et al. |
| 5,889,506 | A | 3/1999 | Lopresti et al. |
| 6,006,225 | A | 12/1999 | Bowman et al. |
| 6,199,082 | B1 | 3/2001 | Ferrel et al. |

(Continued)

FOREIGN PATENT DOCUMENTS

| | | |
|---|---|---|
| EP | 1197020 | 11/2007 |
| GB | 2323489 | 9/1998 |

(Continued)

OTHER PUBLICATIONS

"Gotuit and Pixsy Raise the Bar on Video Search," http://www.gotuit.com/press/2008/0930_Pixsy.html, 3 pages.

(Continued)

*Primary Examiner* — Jeffrey A Burke
(74) *Attorney, Agent, or Firm* — Fountainhead Law Group P.C.

(57) ABSTRACT

A method, apparatus, article of manufacture for providing list of a plurality of media programs responsive to a user search query is disclosed. In one embodiment, the method comprises the steps of accepting an general search query from a user computer, identifying a synonym for the general search query, identifying a category for the general search query according to the identified synonym, performing a categorical search of a media program database using the identified synonym and the identified category to obtain a search result, and transmitting the search result to the user computer for presentation on a display communicatively coupled to the user computer.

23 Claims, 6 Drawing Sheets

(56) References Cited

U.S. PATENT DOCUMENTS

| | | |
|---|---|---|
| 6,505,194 B1 | 1/2003 | Nikolovska et al. |
| 7,136,845 B2 | 11/2006 | Chandrasekar et al. |
| 7,152,059 B2 | 12/2006 | Monteverde |
| 7,523,103 B2 | 4/2009 | Goel et al. |
| 7,562,069 B1* | 7/2009 | Chowdhury et al. |
| 7,627,548 B2 | 12/2009 | Riley et al. |
| 7,636,714 B1 | 12/2009 | Lamping et al. |
| 7,657,151 B2 | 2/2010 | Goodwin et al. |
| 7,779,009 B2 | 8/2010 | Chowdhury et al. |
| 7,788,274 B1 | 8/2010 | Ionescu |
| 7,877,404 B2 | 1/2011 | Achan et al. |
| 7,984,468 B2 | 7/2011 | Westberg |
| 8,108,393 B2 | 1/2012 | Yang et al. |
| 8,200,687 B2 | 6/2012 | Gupta |
| 8,364,669 B1* | 1/2013 | Chowdhury et al. ......... 707/726 |
| 8,560,539 B1* | 10/2013 | Engebretsen ................ 707/736 |
| 8,924,413 B2* | 12/2014 | Jin ............................... 707/769 |
| 2002/0104096 A1 | 8/2002 | Cramer et al. |
| 2002/0188621 A1 | 12/2002 | Flank et al. |
| 2003/0088553 A1* | 5/2003 | Monteverde ...................... 707/3 |
| 2004/0071453 A1 | 4/2004 | Valderas |
| 2004/0080528 A1 | 4/2004 | Rand et al. |
| 2004/0268413 A1 | 12/2004 | Reid et al. |
| 2005/0080776 A1 | 4/2005 | Colledge et al. |
| 2005/0102282 A1 | 5/2005 | Linden |
| 2005/0193015 A1 | 9/2005 | Logston et al. |
| 2005/0198068 A1 | 9/2005 | Mukherjee et al. |
| 2006/0074883 A1 | 4/2006 | Teevan et al. |
| 2006/0167859 A1 | 7/2006 | Verbeck Sibley et al. |
| 2006/0190808 A1 | 8/2006 | Balthaser |
| 2006/0288000 A1 | 12/2006 | Gupta |
| 2007/0074254 A1 | 3/2007 | Sloo |
| 2007/0118512 A1* | 5/2007 | Riley et al. ......................... 707/3 |
| 2007/0136251 A1 | 6/2007 | Colledge et al. |
| 2007/0192305 A1 | 8/2007 | Finley et al. |
| 2007/0214123 A1 | 9/2007 | Messer et al. |
| 2007/0240187 A1 | 10/2007 | Beach et al. |
| 2007/0244863 A1 | 10/2007 | Adams et al. |
| 2007/0244900 A1 | 10/2007 | Hopkins et al. |
| 2007/0271255 A1 | 11/2007 | Pappo |
| 2007/0276790 A1 | 11/2007 | Walsh et al. |
| 2007/0282811 A1 | 12/2007 | Musgrove |
| 2007/0283393 A1 | 12/2007 | Kikinis |
| 2008/0060001 A1 | 3/2008 | Logan et al. |
| 2008/0066107 A1 | 3/2008 | Moonka et al. |
| 2008/0082477 A1 | 4/2008 | Dominowska et al. |
| 2008/0120276 A1 | 5/2008 | Chennavasin |
| 2008/0154856 A1 | 6/2008 | Riise et al. |
| 2008/0282291 A1* | 11/2008 | Henty ............................ 725/44 |
| 2008/0301113 A1 | 12/2008 | Chi et al. |
| 2008/0313564 A1 | 12/2008 | Barve et al. |
| 2009/0024927 A1 | 1/2009 | Schrock et al. |
| 2009/0089251 A1 | 4/2009 | Johnston et al. |
| 2009/0094223 A1* | 4/2009 | Berk et al. ..................... 707/5 |
| 2009/0216737 A1 | 8/2009 | Dexter |
| 2009/0248626 A1 | 10/2009 | Miller |
| 2009/0292700 A1 | 11/2009 | Castellani et al. |
| 2010/0057698 A1 | 3/2010 | Prasad Kantamneni et al. |
| 2010/0057712 A1 | 3/2010 | Ranganathan |
| 2010/0082585 A1 | 4/2010 | Barsook et al. |
| 2010/0082604 A1 | 4/2010 | Gutt et al. |
| 2010/0082657 A1* | 4/2010 | Paparizos ......... G06F 17/30737 707/767 |
| 2010/0082661 A1 | 4/2010 | Beaudreau |
| 2010/0083319 A1 | 4/2010 | Martch et al. |
| 2010/0131499 A1 | 5/2010 | van Leuken et al. |
| 2010/0131563 A1 | 5/2010 | Yin |
| 2010/0146012 A1 | 6/2010 | Beaudreau et al. |

FOREIGN PATENT DOCUMENTS

| | | |
|---|---|---|
| GB | 2443959 | 5/2008 |
| WO | 00/58940 | 10/2000 |
| WO | 2005/001656 | 1/2005 |
| WO | 2005/003899 | 1/2005 |
| WO | 2007/030621 | 3/2007 |
| WO | 2007/030751 | 3/2007 |
| WO | 2007/130472 | 11/2007 |
| WO | 2008/011091 | 1/2008 |

OTHER PUBLICATIONS

"Gotuit Publishes White Paper: 'The Currency of Internet Video,'" http://www.gotuit.com/press/2008/1028_Whitepaper_CurrencyOfInternetVideo.html, 1 page.

The Currency of Internet Video: The Importance of Quality Metadata in Monetizing Internet Video,: Gotuit White Paper, Oct. 2008, pp. 1-13.

"Gotuit Announces Integration with DoubleClick," http://www.gotuit.com/press/2008/1022.sub.—DoubleClick.html, 1 page.

U.S. Appl. No. 13/348,405, filed Jan. 11, 2012 titled "Method and Apparatus for Searching Media Program Databases".

* cited by examiner

SEARCHING MEDIA PROGRAM DATABASES

CROSS-REFERENCE TO RELATED APPLICATIONS

This application is a continuation of U.S. patent application Ser. No. 13/348,405, entitled "METHOD AND APPARATUS FOR SEARCHING MEDIA PROGRAM DATABASES," filed Jan. 11, 2012, which is a continuation of U.S. patent application Ser. No. 12/351,578, entitled "METHOD AND APPARATUS FOR SEARCHING MEDIA PROGRAM DATABASES," filed Jan. 9, 2009, issued as U.S. Pat. No. 8,108,393 on Jan. 31, 2012, which are hereby incorporated by reference herein.

BACKGROUND

1. Field

The present invention relates to systems and methods for providing searchable program guide information and in particular, to systems and methods for providing categorical search results in response to a general search query.

2. Description of the Related Art

The dissemination and playback of media programs has undergone substantial changes in the past decade. Previously, media programs were disseminated either by analog broadcast (conventional, satellite, or cable) or by dissemination of films to movie theaters.

These traditional dissemination and playback means remain in use after the advent of digital technology. However, digital technologies have had a profound effect on the dissemination and playback of media programs.

First, digital technology permitted the use of digital video recorders (DVRs). DVRs, while similar in function to standard analog video cassette recorders (VCRs), provide a number of additional useful functions including live pause, the ability to record one program while playing back another, and the integration of the electronic program guides with DVR functionality (so that the recordation of media programs could be scheduled far in advance).

Second, technology also permitted the dissemination and playback of media programs via the Internet, and with improved signal processing and more and more households with high-speed Internet access (e.g. DSL, fiber, satellite), this method of dissemination and playback has become competitive with traditional means. Dissemination of media programs via the Internet may occur either by simple downloading, progressive downloading or streaming.

For progressive download, a media file having the media program is downloaded via the Internet using dial-up, DSL, ADSL, cable, T1, or other high speed internet connections. Simple downloading downloads the bytes of the media file in any convenient order, while progressive download downloads bytes at the beginning of a file and continues downloading the file sequentially until the last byte. At any particular time during progressive downloading, portions of the file are not immediately available for playback. In some situations, the entire file must be downloaded first before a media player can start playback. In other situations, media players are able to start playback once enough of the beginning of the file has downloaded, however, the media player must download enough information to support some form of playback before playback can occur. Playback is often delayed by slow Internet connections and are also often choppy and contains a high likelihood of stopping after only a few seconds. Downloaded material is thereafter stored on the end-user computer.

Streaming delivers media content continuously to a media player and media playback occurs simultaneously. The end-user is capable of playing the media immediately upon delivery by the content provider. Traditional streaming techniques originated from a single provider delivering a stream of data to a set of end-users. High bandwidths and CPU power are required to deliver a single stream to a large audience, and the required bandwidth of the provider increases as the number of end-users increases.

Unlike progressive downloading, streaming media is delivered on demand or live. Wherein progressive download requires downloading the entire file or downloading enough of the entire file to start playback at the beginning, streaming enables immediate playback at any point within the file. End-users may skip through the media file to start playback or change playback to any point in the media file. Hence, the end-user does not need to wait for the file to progressively download. Typically, media is typically delivered from a few dedicated servers having high bandwidth capabilities.

On-demand streaming media services allow a broad spectrum of media programs to be made available to the user for immediate viewing. One of the challenges in providing on-demand streaming media services is to provide the user with an interface that allows the user to efficiently select which media program they would like to view. In the golden era of broadcast television, a small number of channels were available, and it was a simple matter for the user to simply check each channel or refer to a printed guide. The advent of satellite or cable television multiplied the number of such channels, and provided program guides similar to the printed schedules. However, the number of channels was still relatively limited. The storage capacity of DVRs is such that simple hierarchical menu interfaces permit the user to easily and quickly gain access to recorded programs.

One way to provide the user with information about available media programs is to provide the user with the ability to search a database of available media programs. For example, if a user is interested in viewing a media program known as "The A Team," the user may enter 'The A Team' in a textural input element (using a computer, for example). However, using known search engines (such as those available from GOOGLE or YAHOO, when the user does so, the search engine often returns unwanted results. That is because the search engine regards the terms used in the search query as logically related by 'and/or.' That is, the search engine parses out each word in the search query (in this case, "the," "a," and "team") and presents a list that shows the result for [the <and> a <and> team] first, then [the <or> a <or> team]. Further, even if the user were to enter "The A Team" in quotes (indicating they are searching for the term precisely as supplied in the query), such search engines typically ignore terms like "a" and "the." As a result, the user is provided with unwanted search results.

Further, users may desire to search for media programs by data category, such as the name of the show (e.g. "The A-Team"), the performers portraying characters in the show (George Peppard, Dirk Benedict and Mr. T), or other search parameters. While it is possible to provide the user with an interface with a textural input element for each data category (for example, one to search by the name of the show and another to search by actor) or one textural input element that can be selectably configured to a particular category (e.g. one textural input element and an adjacent down box or radio button that allows the user to select the data category "show name" or "performer" for the search), such interfaces consume valuable space, are inconvenient, and are often ignored by the user.

What is needed is a system and method for a search capability that infers the proper data category from the search request, thus reducing unwanted search results. The present invention satisfies this need.

SUMMARY

To address the requirements described above, the present invention discloses a method, apparatus and article of manufacture for providing list of a plurality of media programs responsive to a user search query. In one embodiment, the method comprises the steps of accepting an general search query from a user computer, identifying a synonym for the general search query, identifying a category for the general search query according to the identified synonym, performing a categorical search of a media program database using the identified synonym and the identified category to obtain a search result, and transmitting the search result to the user computer for presentation on a display communicatively coupled to the user computer. In a further embodiment, the synonym is identified from a list of synonyms that is generated by accepting a plurality of previous general search queries from further users, presenting a plurality of previous search results to the further users, each of the previous search results responsive to the corresponding previous general search queries, and each search result comprising a plurality of hotlinks, each hotlink associated with a media program responsive to the respective general search query, accepting a selection of one of the plurality of hotlinks for each of the plurality of search results, associating each of the previous general search queries with the media program associated with the respective one of the plurality of selected hotlinks, and identifying at least one of the previous general search queries as a synonym for the media program if a percentage of previous general search queries are associated with the media program. In other embodiments, the foregoing is embodied in means for performing the foregoing operations or in a program storage device for performing such operations.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
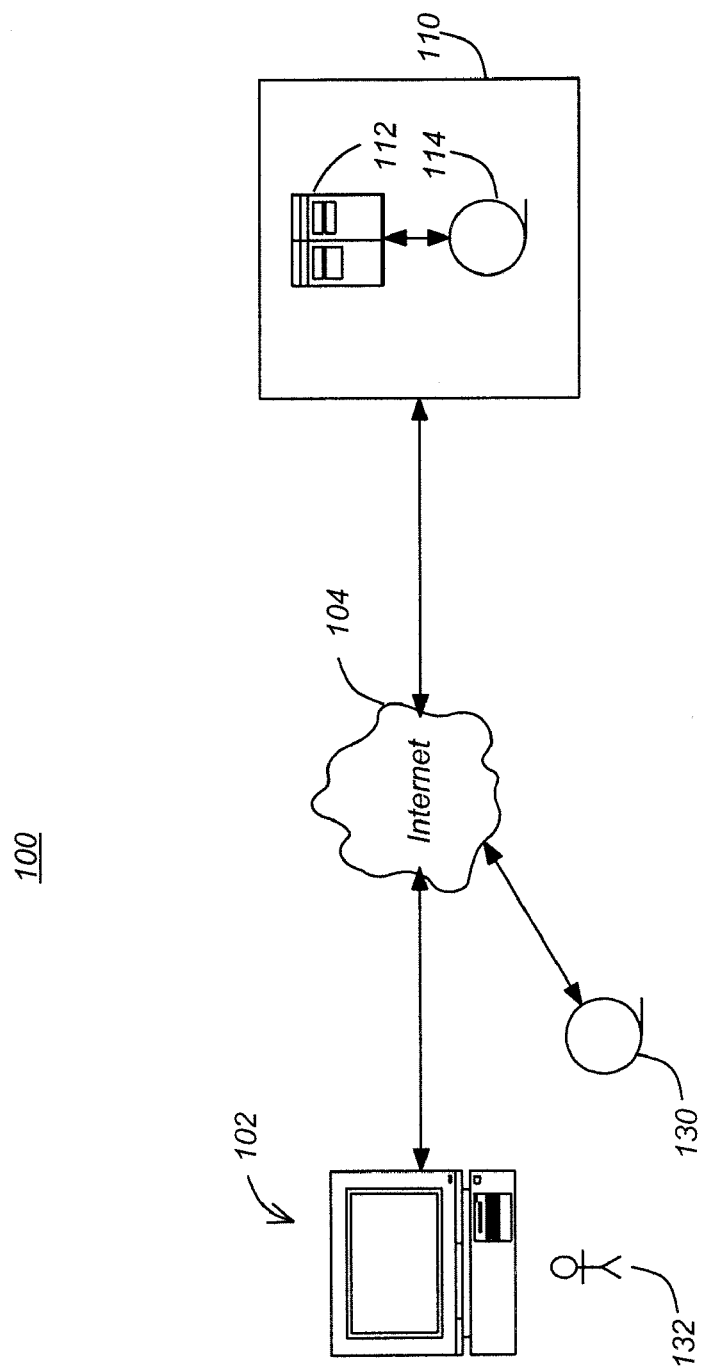
FIG. 1 is a diagram illustrating an exemplary media program system.

FIG. 1 is a diagram illustrating an exemplary media program system 100. In the illustrated embodiment, the system 100 comprises a media program provider 110, communicatively coupled to a communication network 104 such as the Internet, and having one or more provider video servers 112 and a media program database 114. Typically, the media program database 114 includes a database of both the media programs themselves, and metadata describing the media programs. The metadata describing the media programs can be provided by the source of the media program itself (e.g. www.fox.com) or independent media program source such as www.imdb.com or www.tv.com. In one embodiment, the media program provider 110 is a video-on-demand media program provider. An example of a media program provider 110 includes www.hulu.com. Using a computer a computer system 102, remote users 132 can communicate with the media program provider 110, to obtain media programs (including video-on-demand services) and to search the provider media program database 114 to find media programs of interest.

Figure 2:
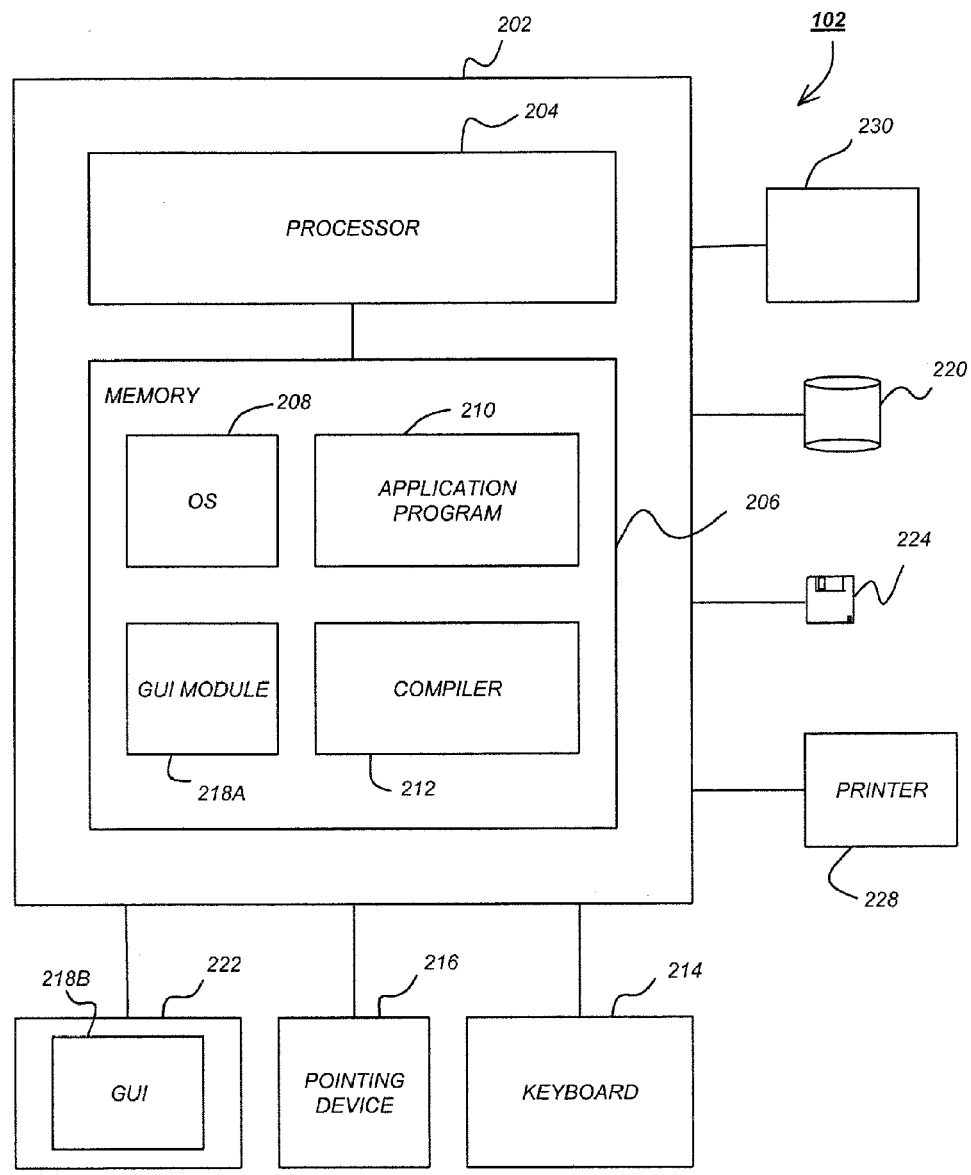
FIG. 2 illustrates an exemplary computer system 102 that could be used to implement the present invention.

FIG. 2 illustrates an exemplary computer system 102 that could be used to implement the present invention. The computer 202 comprises a processor 204 and a memory, such as random access memory (RAM) 206. The computer 202 is operatively coupled to a display 222, which presents images such as windows to the user on a graphical user interface 218B. The computer 202 may be coupled to other devices, such as a keyboard 214, a mouse device 216, a printer, etc. Of course, those skilled in the art will recognize that any combination of the above components, or any number of different components, peripherals, and other devices, may be used with the computer 202.

Generally, the computer 202 operates under control of an operating system 208 stored in the memory 206, and interfaces with the user to accept inputs and commands and to present results through a graphical user interface (GUI) module 218A. Although the GUI module 218A is depicted as a separate module, the instructions performing the GUI functions can be resident or distributed in the operating system 208, the computer program 210, or implemented with special purpose memory and processors. The computer 202 also implements a compiler 212 which allows an application program 210 written in a programming language such as COBOL, C++, FORTRAN, or other language to be translated into processor 204 readable code. After completion, the application 210 accesses and manipulates data stored in the memory 206 of the computer 202 using the relationships and logic that was generated using the compiler 212. The computer 202 also optionally comprises an external communication device such as a modem, satellite link, Ethernet card, or other device for communicating with other computers.

In one embodiment, instructions implementing the operating system 208, the computer program 210, and the compiler 212 are tangibly embodied in a computer-readable medium, e.g., data storage device 220, which could include one or more fixed or removable data storage devices, such as a zip drive, floppy disc drive 224, hard drive, CD-ROM drive, tape drive, etc. Further, the operating system 208 and the computer program 210 are comprised of instructions which, when read and executed by the computer 202, causes the computer 202 to perform the steps necessary to implement and/or use the present invention. Computer program 210 and/or operating instructions may also be tangibly embodied in memory 206 and/or data communications devices 230, thereby making a computer program product or article of manufacture according to the invention. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Figure 3:
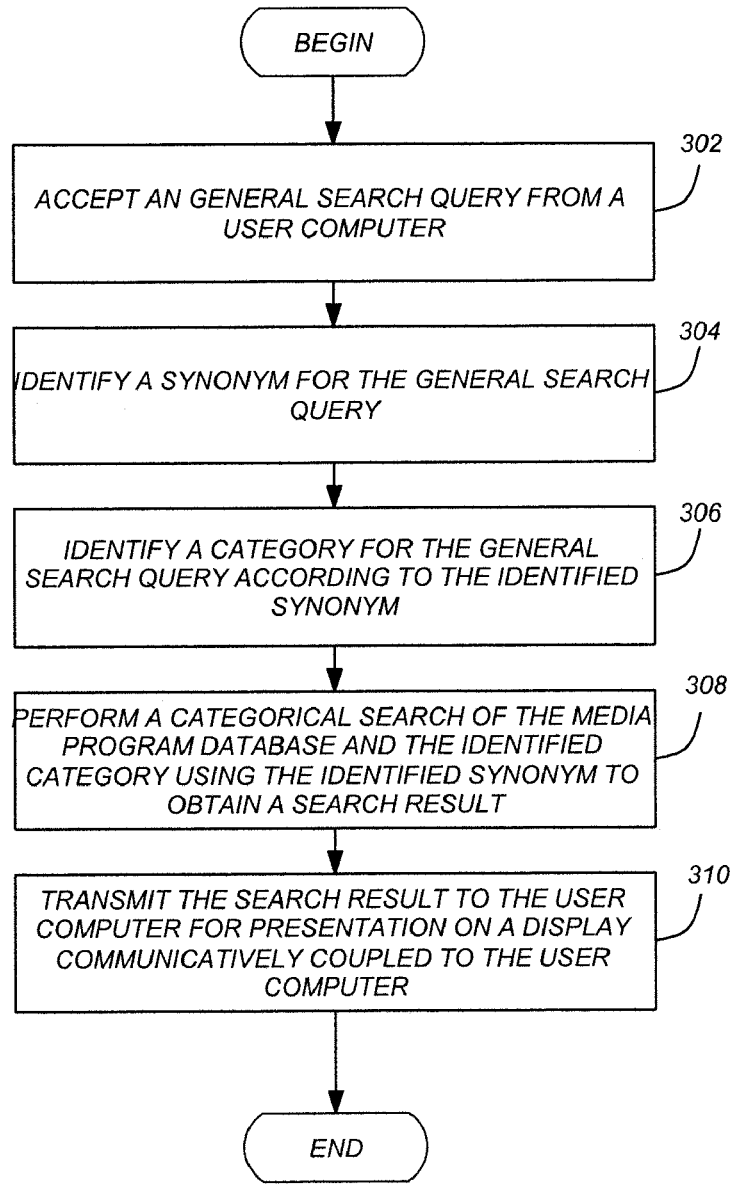
FIG. 3 is a diagram illustrating exemplary process steps that can be used to practice one embodiment of the present invention.

FIG. 3 is a diagram illustrating exemplary process steps that can be used to practice one embodiment of the present invention. In block 302, a general search query is accepted from a user computer 102. A "general search query" is a query that has not been identified as belonging to any particular data category or type (e.g. uncategorized). For example, media programs are typically associated with a show name and the names of the performers that portray a character in the media program. The user may perform a categorical search of a media program database 114 by entering a show name in a text box of a user interface and identifying the search as one for a comparable show name. This can be accomplished by entering the text into a text box dedicated for show name queries alone, or by entering the text into a generic text box and otherwise delineating the text as referring to a show name (e.g. by drop-down box or radio button). When the user so identifies the search as one for a show name, the media program database 114 is searched for matching show names, and provides the results. The user can obtain similar results by entering a performer name and delineating the search as one directed to a performer name. By doing so, the user provides context that is used in the search of the media program database, and that context helps prevent receiving unwanted search results.

In contrast, when the user enters a general search query (whether by entering the text in an input text box dedicated to general search queries or otherwise delineating the search query as general), the user has provided no information to the media program database 114 regarding the category of data to be searched. Hence, a search for "John Paul Jones" may retrieve information about a media program with a show name of "John Paul Jones" about a famous Revolutionary War captain or a music video starring the bassist of Led Zeppelin. In this context, a "general search query" is a query that has not been identified as being directed to any particular category of media program data.

Figure 4:
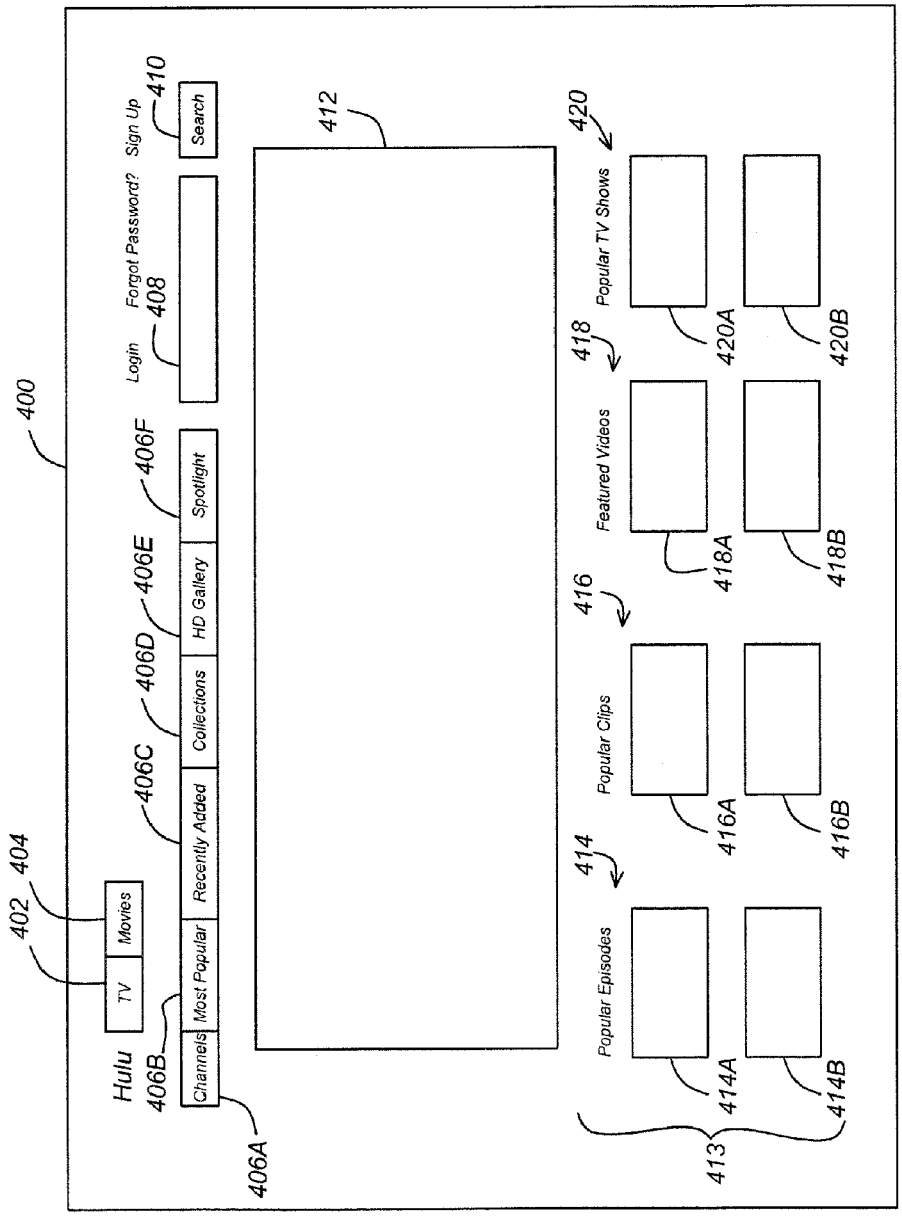
FIG. 4 is a simplified diagram illustrating one embodiment of a program guide that can be used by the user computer specify search requests.

FIG. 4 is a simplified diagram illustrating one embodiment of a program guide 400 that can be used by the user computer 102 specify search requests. In the illustrated embodiment, the program guide 400 comprises a TV button 402, and a Movies button 404. When the TV button 402 is selected, the program guide 400 presents information regarding television media programs (e.g. media programs that were first transmitted on television), and when the movies button 404 is selected, the program guide 400 presents information regarding movie media programs.

The illustrated program guide 400 also comprises a command bar 406, having a channels button 406A, a most popular button 406B, a recently added button 406C, a collections button 406D, an HD (high definition) gallery button 406E, and a spotlight button 406F. Rolling over the channels button 406A opens an interface wherein the user is permitted to select one of a plurality of "channels," each channel devoted to a particular type of media program. For example, channels may include sports, drama, comedy, reality shows, and all shows. Depressing the most popular button 406B returns the current most popular media programs, and depressing the recently added button 406C returns the most recently added media programs. Depressing the collections button 406D returns media programs having a common theme or interest (for example, media programs about a holiday, such as Thanksgiving or Christmas). Depressing the HD gallery button 406E returns media programs that are offered in high definition, and depressing the spotlight button 406F returns spotlighted media programs (for example, media programs that the media program provider 110 has decided might be of particular interest to viewers.

The illustrated program guide 400 also includes a general search text box 408 in which the user may enter the search query (which will ordinarily comprise a combination of characters and/or digits). The user may launch the search by depressing the return key on the keyboard 214 or by selecting the search button 410.

The illustrated program guide 400 also includes a barker element 412 in which stills or clips of media programs of interest may be replayed. In one embodiment, the highlighted media programs are presented in carousel fashion, one after the other, without user inter intervention or input.

Finally, the illustrated program guide 400 also includes a portion 413 in which thumbnails for popular and featured media programs are shown. This includes a subportion 414 for thumbnails of popular episodes 414A, 414B, a subportion 416 for popular clips 416A, 416B, a subportion 418 for featured videos 418A, 418B, and a subportion 420 for popular TV shows 420A and 420B.

For illustrative purposes we assume that the user has entered the search query "The A Teem" in the general search text box 408 and depressed the search button 410.

Returning to FIG. 3, a synonym is identified for the search query, as shown in block 304. A synonym for a search query is a search term or combination of search terms that has been determined to have the same meaning or to be directed to the same search result as the search query. For example, synonyms for the search query "The A Teem" may include "The A-Team" (the correctly spelled show name), "The A Team," "The A-Teem," "A-Teem," and "A-Teem," all of which are known to be in the data category of show names (not performer names).

Next, a category is identified for the general search query according to the identified synonym, as shown in block 306. In one embodiment, the category is selected from the group comprising show name (e.g. the title of the movie or the TV show . . . not the episode name) and the performer name. In the example above, wherein the user entered "The A Teem" into the search text box 408, and one of the identified synonyms for "The A Teem" may include "The A-Team," "The A Team," "The A-Teem," "A-Teem," and "A-Teem" is identified. The correct spelled synonym ("The A-Team") may be further identified.

Next, a search of the media program database 114 is performed using the identified (or further identified) synonym, to obtain a search result, as shown in block 308. In one embodiment, the search is a general search using the further identified synonym (e.g. "The A-Team"). In another embodiment, the search is a categorical search using the data category (in the example, show names) using the further identified synonym ("The A-Team"). By limiting the search to media program database show name entries (instead of entries in all data categories) and using "The A-Team" instead of "The A Teem," the search result will include fewer inaccurate results.

Finally, the search result is transmitted to the user computer 120 for presentation on the communicatively coupled display 222, as shown in block 310.

Figure 5:
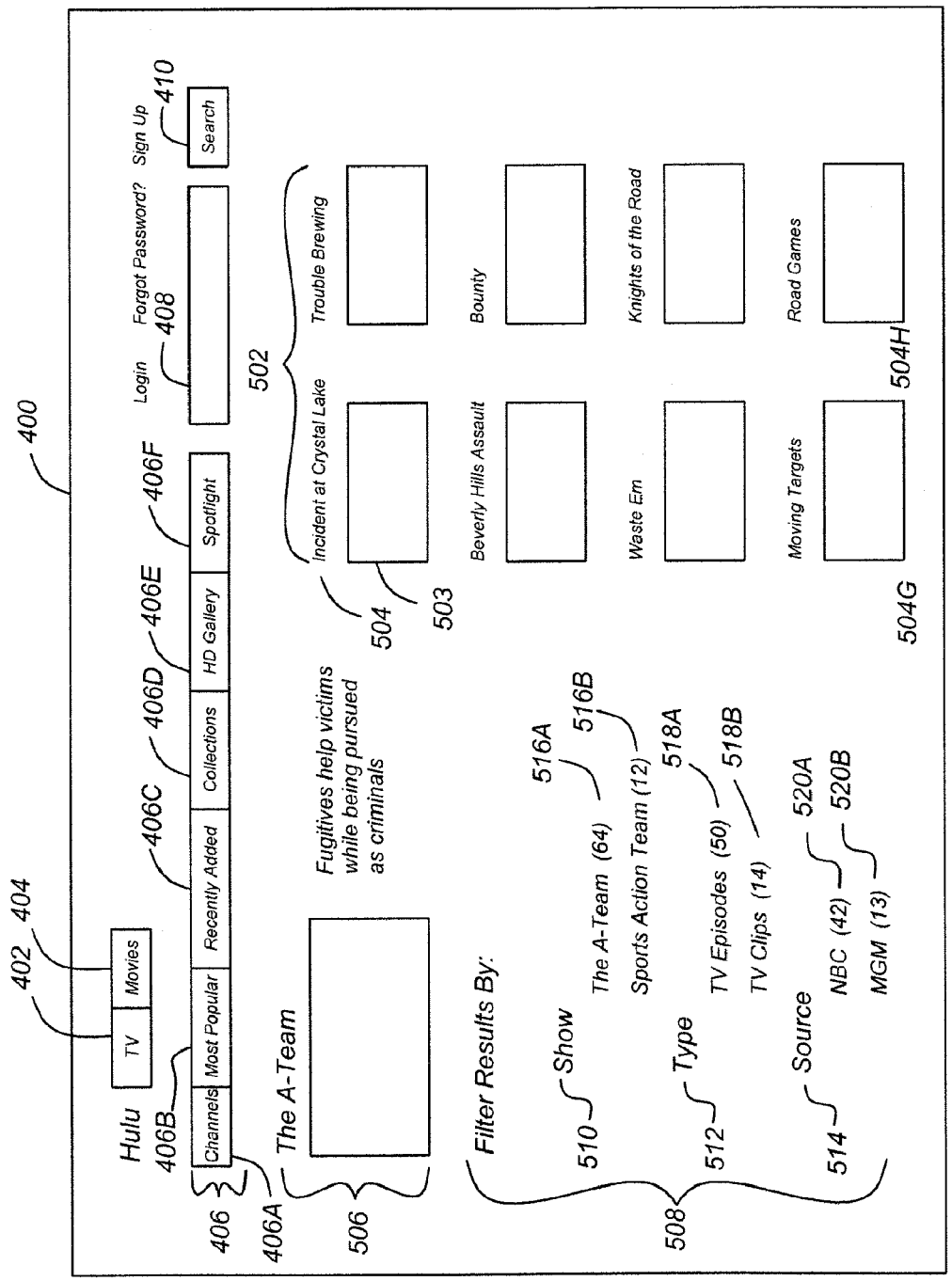
FIG. 5 is a diagram illustrating one embodiment of the program guide presenting search results.

FIG. 5 is a diagram illustrating one embodiment of the program guide 400 presenting search results. In the illustrated embodiment, the search result for the general search query "The A Teem" is presented. As illustrated, the search result is presented in three portions of the program guide 400. A first portion 502 presents media programs responsive to the search query. In the illustrated embodiment, a thumbnail 503 and a hotlink 504 is provided for each media program responsive to the search query, which comprises a plurality of episodes of "The A-Team". The user may select any of the media program episodes for playback by selecting the hotlink 504 or the thumbnail 503.

The search result may also be provided in a second portion 506, which provides a summary of the show associated with the episodes (in this case, "The A-Team"). A short description of the series and a thumbnail may also be provided.

The search result may also be optionally provided in a third portion 508, which permits the user to filter the results by show 510, type 512, or source 514. In one embodiment, the results presented in the third portion 508 ignores the identified category of the search query, and instead, presents the results for the general search result using the identified synonym (in this case, "The A-Team") in any data category. Hence, the user is presented the option of filtering the results by show name, and is presented with a number of possible show names that were retrieved using the general search query. In the illustrated embodiment, for example, the show name "The A-Team" and also "Sports Action Team" were responsive to the general search "The A-Team", and a hotlink 516A, 516B is provided for each showname. The user can filter the results to include only show names equivalent to "The A-Team" by selecting hotlink 516A, for example, and to include only show names equivalent to "Sports Action Team" by selecting hotlink 516B. Similarly, the search result can be limited to entire episodes or clips by selecting hotlink 518A or 518B, respectively, and to media programs ultimately from NBC or MGM by selecting hotlink 520A or 520B, respectively.

Synonyms can be identified by examining previous responses to search queries performed by the user or other users. For example, the user in the above example will not likely have been the first user to enter "The A Teem" as a search query. In spite of the spelling error, the media program database will provide such users with results that include the media program show name they were interested in (e.g. "The A-Team"), and presumably, when those users see the result, they will select a hotlink or thumbnail associated with "The A-Team" in the search result to request the media program they are interested in seeing. By noting that a large number of users who entered "The A Teem" select the hotlink associated with "The A-Team," the media program database 114 may reasonably infer that "The A Teem" and "The A-Team" are synonyms, and regard them as such. This association may be made on a global level (e.g. by examining the behavior of a number of third party users) or by examining the behavior of each individual user and using that behavior to identify synonyms.

Figure 6:
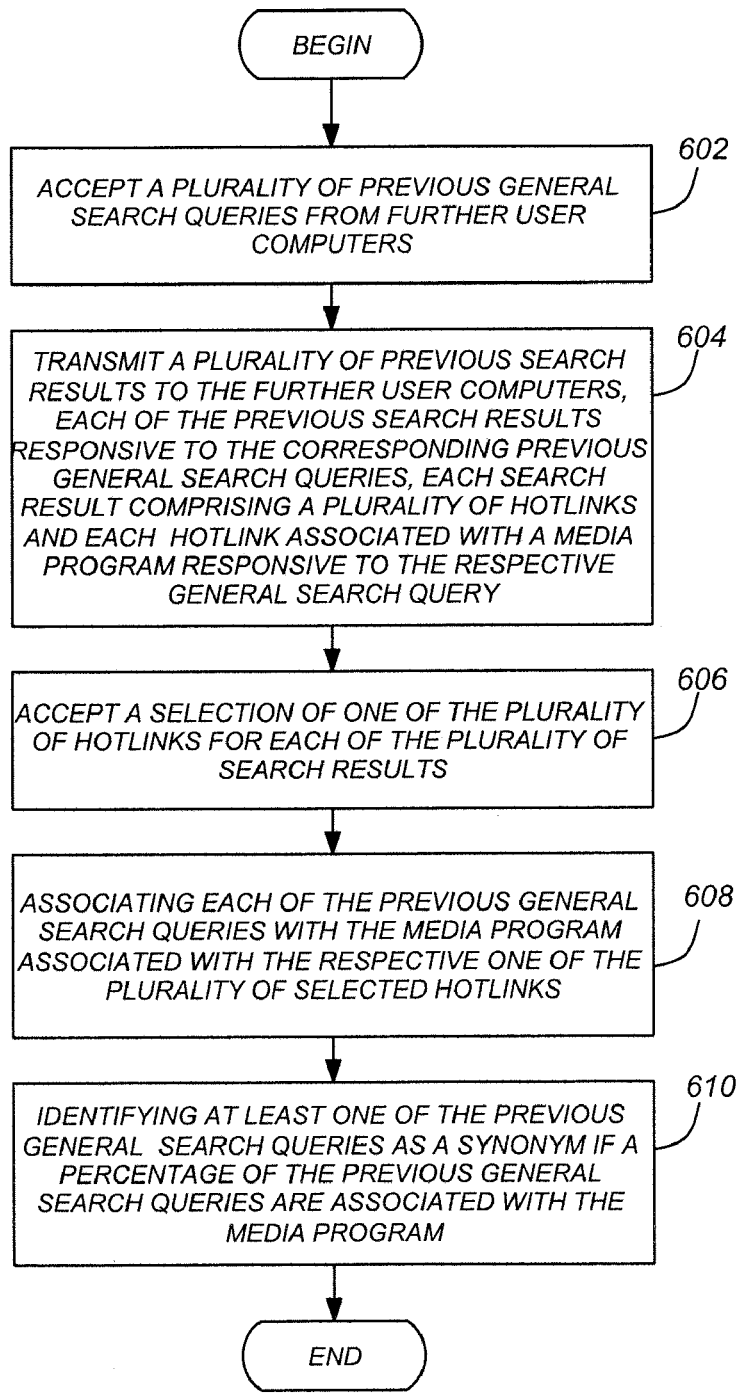
FIG. 6 is a diagram illustrating one embodiment of how synonyms for search queries can be identified.

FIG. 6 is a diagram illustrating one embodiment of how synonyms for search queries can be identified. In block 602, a plurality of previous uncategorized (or general) search queries are accepted from user computers (which may or may not include the user computer making the search query identified in FIG. 3). Search results responsive to each corresponding one of these search queries is transmitted to the user making the query, as shown in block 604. Each of the search queries also comprises a plurality of hotlinks associated with a media program responsive to the respective uncategorized search query.

In block 606, a selection of one of the plurality of hotlinks for each of the plurality of search results is accepted. In other words, the users view the search results and by selecting the hotlink the viewer is provided access to the media program associated with the hotlink. The accepted hotlink selections are also transmitted to the media program provider 110 and used to help identify synonyms. This is accomplished by associating each of the previous general search queries described in block 402 with the media program associated with the respective one of the plurality of selected hotlinks, as shown in block 408.

Finally, as shown in block 410, a previous search query can be identified as a synonym for a media program or for data associated with a media program if a percentage of the previous uncategorized search queries were associated with the media program in block 408. For example, if 20% of the users who entered a search query of "The A Teem" select the hotlink associated with "The A-Team", "The A Teem" and "The A-Team" are identified as synonyms, both describing the show name for the same media program.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method comprising:
   identifying, by a computing device, a synonym including one or more search terms that is determined to be synonymous with a term;
   accepting, by the computing device, a general search query including the term from a user computer, wherein the general search query has not been identified as being directed to any particular media program category in a plurality of media program categories;
   associating, by the computing device, the synonym with the term in the general search query;
   selecting, by the computing device, a search term in the one or more search terms for the synonym for use in identifying a media program category;
   using, by the computing device, the search term of the synonym to identify the media program category in the plurality of media program categories;
   performing, by the computing device, a categorical search of a media program database based on the general search query and the identified media program category to obtain a categorical search result including a list of media programs that are categorized in the identified media program category; and outputting, by the computing device, the categorical search result in conjunction with the identified media program category.

2. The method of claim 1, wherein performing the categorical search comprises:

performing the categorical search using the one or more search terms for the synonym.

3. The method of claim 2, wherein a plurality of synonyms is generated by performing steps prior to the accepting of the general search query, the method further comprising:

accepting a plurality of previous general search queries;

presenting a plurality of previous search results, each of the previous search results responsive to corresponding previous general search queries;

accepting a selection of one of the previous search results;

associating each of the previous general search queries with a media program associated with the respective one of the plurality of the previous search results based on the selection; and identifying at least one of the previous general search queries as a synonym for the media program if a threshold percentage of previous general search queries are associated with the media program.

4. The method of claim 1, wherein the identified media program category is selected from the group comprising a media program title category and a media program performer category.

5. The method of claim 1, wherein outputting comprises causing presentation of the categorical search result on a display of the user computer.

6. The method of claim 1, wherein the plurality of media program categories are associated with characteristics of media programs.

7. The method of claim 1, wherein the general search query is entered into a general search query entry box or an entry box where a media program category is not specified for the entry box.

8. The method of claim 1, wherein analyzing comprises:

categorizing one or more terms of the general search query in one or more media program categories; and selecting one of the media program categories based on the one or more categorized terms.

9. The method of claim 1, further comprising:

performing a general search using the general search query to determine a general search result, wherein the general search does not perform the search in a specific media program category; and outputting the general search result and the categorical search result together on an interface.

10. The method of claim 1, wherein the analyzing, performing, and outputting are performed without accepting further user input from a user.

11. The method of claim 1, wherein the categorical search result is first output in conjunction with the identified media program category without any particular media program category in the plurality of media program categories being received from the general search query.

12. The method of claim 1, wherein performing the categorical search comprises:

performing the categorical search using only the search term in the one or more search terms.

13. A non-transitory computer-readable storage medium containing instructions, that when executed, control a computer system to be configured for:

identifying a synonym including one or more search terms that is determined to be synonymous with a term;

accepting a general search query including the term from a user computer, wherein the general search query has not been identified as being directed to any particular media program category in a plurality of media program categories;

associating the synonym with the term in the general search query;

selecting a search term in the one or more search terms for the synonym for use in identifying a media program category;

using the search term of the synonym to identify the media program category in the plurality of media program categories;

performing a categorical search of a media program database based on the general search query and the identified media program category to obtain a categorical search result including a list of media programs that are categorized in the identified media program category; and outputting the categorical search result in conjunction with the identified media program category.

14. The non-transitory computer-readable storage medium of claim 13, wherein performing the categorical search comprises:

performing the categorical search using the one or more search terms for the synonym.

15. The non-transitory computer-readable storage medium of claim 14, wherein a plurality of synonyms is generated by performing steps prior to the accepting of the general search query, further configured for:

accepting a plurality of previous general search queries;

presenting a plurality of previous search results, each of the previous search results responsive to corresponding previous general search queries;

accepting a selection of one of the previous search results;

associating each of the previous general search queries with a media program associated with the respective one of the plurality of the previous search results based on the selection; and identifying at least one of the previous general search queries as a synonym for the media program if a threshold percentage of previous general search queries are associated with the media program.

16. The non-transitory computer-readable storage medium of claim 13, wherein the identified media program category is selected from the group comprising a media program title category and a media program performer category.

17. The non-transitory computer-readable storage medium of claim 13, wherein outputting comprises causing presentation of the categorical search result on a display of the user computer.

18. The non-transitory computer-readable storage medium of claim 13, wherein the plurality of media program categories are associated with characteristics of media programs.

19. The non-transitory computer-readable storage medium of claim 13, wherein the general search query is entered into a general search query entry box or an entry box where a media program category is not specified for the entry box.

20. The non-transitory computer-readable storage medium of claim 13, wherein analyzing comprises:
  categorizing one or more terms of the general search query in one or more media program categories; and
  selecting one of the media program categories based on the one or more categorized terms.

21. The non-transitory computer-readable storage medium of claim 13, further configured for:
  performing a general search using the general search query to determine a general search result, wherein the general search does not perform the search in a specific media program category; and
  outputting the general search result and the categorical search result together on an interface.

22. The non-transitory computer-readable storage medium of claim 13, wherein the categorical search result is first output in conjunction with the identified media program category without any particular media program category in the plurality of media program categories being received from the general search query.

23. An apparatus comprising:
  one or more computer processors; and
  a non-transitory computer-readable storage medium comprising instructions, that when executed, control the one or more computer processors to be configured for:
    identifying a synonym including one or more search terms that is determined to be synonymous with a term;
    accepting a general search query including the term from a user computer, wherein the general search query has not been identified as being directed to any particular media program category in a plurality of media program categories;
    associating the synonym with the term in the general search query;
    selecting a search term in the one or more search terms for the synonym for use in identifying a media program category;
    using the search term of the synonym to identify the media program category in the plurality of media program categories;
    performing a categorical search of a media program database based on the general search query and the identified media program category to obtain a categorical search result including a list of media programs that are categorized in the identified media program category; and
    outputting the categorical search result in conjunction with the identified media program category.

\* \* \* \* \*